United States Patent
Boehm

(10) Patent No.: US 6,728,654 B2
(45) Date of Patent: Apr. 27, 2004

(54) RANDOM NUMBER INDEXING METHOD AND APPARATUS THAT ELIMINATES SOFTWARE CALL SEQUENCE DEPENDENCY

(75) Inventor: Fritz A. Boehm, Austin, TX (US)

(73) Assignee: Intrinsity, Inc., Austin, TX (US)

( * ) Notice: Subject to any disclaimer, the term of this patent is extended or adjusted under 35 U.S.C. 154(b) by 187 days.

(21) Appl. No.: 09/965,945

(22) Filed: Sep. 28, 2001

(65) Prior Publication Data

US 2003/0023396 A1 Jan. 30, 2003

Related U.S. Application Data

(60) Provisional application No. 60/302,588, filed on Jul. 2, 2001.

(51) Int. Cl.[7] .................................................. G06F 5/00
(52) U.S. Cl. ...................... 702/119; 702/120; 702/122; 702/123
(58) Field of Search .................. 702/79, 119, 120, 702/122, 123, 179, 182, 188, 196; 435/6; 388/100; 345/204

(56) References Cited

U.S. PATENT DOCUMENTS

| | | | | | |
|---|---|---|---|---|---|
| 4,834,375 A | * | 5/1989 | Elstein et al. | .................. | 273/26 |
| 6,326,538 B1 | * | 12/2001 | Kay | ............................. | 84/635 |
| 6,490,354 B2 | * | 12/2002 | Venkatesan et al. | .......... | 380/43 |

* cited by examiner

*Primary Examiner*—Marc S. Hoff
*Assistant Examiner*—Felix Suarez
(74) *Attorney, Agent, or Firm*—Booth Wright LLP; Matthew J. Booth; Karen S. Wright

(57) ABSTRACT

A random number indexing method and apparatus includes an index array 302 that uniquely identifies each pseudo-random number in a sequence of numbers generated by a pseudo-random number generator 202. A computer program 102 provides a seed value to the pseudo-random number generator and populates the index array. The computer program uses the identifying indicia in the index array to call for and receive pseudo-random numbers.

12 Claims, 5 Drawing Sheets

RANDOM NUMBER INDEXING METHOD AND APPARATUS THAT ELIMINATES SOFTWARE CALL SEQUENCE DEPENDENCY

This application claims the benefits of the earlier filed U.S. Provisional Application Serial No. 60/302,588, filed Jul. 2, 2001 (Jul. 2, 2001), which is incorporated by reference for all purposes into this specification.

BACKGROUND OF THE INVENTION

1. Field of the Invention

The present invention relates to computer programs that use sequences of pseudo-randomly generated numbers. More specifically, the present invention provides a method to access a sequence of pseudo-randomly generated numbers to insure that each number generated and used in response to each specific call for a number in a software routine is repeatable and predictable from software version to software version.

2. Description of the Related Art

Random test generation programs have been around since the early days of microprocessor verification. These programs automate the complex job of creating large test suites necessary for the functional verification of computer systems by using random number generators to, among other things, generate test stimuli, initialize registers, pre-load caches, select operands, and the like. Those skilled in the art are well aware that the verification of modern circuit designs, especially that of large complex sequential logic designs such as a processor or an entire computer system, often takes the greater part of the resources during a design process. Design verification can be a significant bottleneck, greatly impacting the design cycle and the overall time-to-market of a new design.

In the past, processors and other complex sequential logic circuits were statically verified, meaning that verification tests were assembled from instructions, control flags, and data selected from pre-prepared tables without regard for the intermediate machine states of the processor during the execution of the test. These static tests included some degree of randomness, to increase the number of test cases and to achieve a greater degree of test coverage. For example, a test-case generator might choose a random mix of hand-generated fixed scripts, and insert random parameter values in the scripts. However, static verification methods required painstaking human composition and verification of long, multilevel queries, so they were extraordinarily time-consuming. Even with random selection of scripts and random values for script parameters, the inability to take into account intermediate processor states meant that certain real-life combinations simply went untested. As processors became more complex, the effort required to design and conduct static verification testing increased exponentially, even as the achievable test coverage declined dramatically.

Consequently, the industry has moved toward the use of dynamically generated, biased pseudo-random test patterns, which can automatically and quickly create an efficient, robust test environment for complex sequential circuits such as processors. In dynamic testing, instructions are generated, all processor resources and facilities needed for executing the instruction are identified and initialized if required, the execution of the instruction is simulated on a model of the design under test, and state is updated to reflect the execution results. The process then iterates, and each instruction generated at the beginning of each iteration is generated with knowledge of the processor state that resulted from the last step executed. Although there are differences in the details of how instructions are generated from test method to test method, in general, instructions are selected for generation using some version of a pseudo-random number generator. Those skilled in the art are generally familiar with the various current methods used to generate and use pseudo-random numbers to support functional verification of complex circuits using dynamically generated biased psuedo-random test patterns.

The relative ease of creating dynamically generated random test programs, combined with the potential for verification bottlenecks, has led logic designers to initiate design verification efforts early in the design process. However, developing appropriate tests using a test generator early, while the design effort is still progressing, requires a significant degree of design flexibility and documentary discipline. Frequent changes to both the test generator and the simulation model are typical, because the system architecture may not be firm, and because implementation-specific details of the test programs are ordinarily decided as the system design progresses. When either the test generator or simulation model is modified, designers typically perform some degree of regression testing, wherein past test patterns are regenerated, rerun, and the results compared, to ensure that no new problems are created by the updates. Also, designers may find it useful to maintain and rerun certain highly successful test patterns from time to time, particularly when a test pattern has been generated that specifically targets a certain function, or is exceptionally complex, or has been determined to provide exceptionally good coverage. Consequently, test patterns must be stored in a library to support regression testing and ongoing design verification efforts.

Rather than storing an entire test pattern, which would require significant storage space, test patterns are saved by storing their control parameters and past results. Control parameters associated with a particular test pattern will typically include some sort of identifying indicia for handling the test pattern in the test library, comments explaining the purpose of the test, the starting seed for the random number generator, and any other externally provided initial conditions to regenerate the program when required. Ordinarily, saving the control parameters of a test pattern is sufficient to assure that the test pattern can be faithfully recreated when required.

However, problems may arise when a test generator, or the simulation model that the generator is using, includes multiple calls to a random number generator for random numbers to perform various aspects of the test generation. In order for a specific test identified by specific control parameters to be repeatable, the random numbers supplied to the test generator must be supplied identically, in response to the same call from the generator or the model every time the test is initiated. Consequently, either the specific order of the test generator's calls for random numbers must be maintained across generator/model software versions, or the specific number that is supplied to the test generator or model in response to each specific call must be maintained across software versions. Absent one of these controls, a particular test identified by certain control parameters may not be repeatable in a test generator that includes multiple calls for random numbers if new calls are inserted. This occurs because the number generator will always generate the same sequence of numbers in the same order in response to the seed contained within the test control parameters.

To illustrate the problem, assume a test generator generating verification tests for a processor under design generates and runs a test pattern P1 that includes random number seed S1. Suppose that the generator first requests a random number to use in selecting an instruction, then a sequence of four random numbers to use in initializing four registers, then a sequence of five random numbers that it uses to preload the cache. Thereafter, the test generator generates the instruction, simulates its execution on the model, and updates state. Table 1 below shows the sequence of random numbers as they are generated and supplied to the various functions of the test generator.

TABLE 1

| Generator Request | Random number supplied | Random number use |
|---|---|---|
| Request 1 | R1 | Selecting instruction for generation |
| Request 2 | R2–R5 | Initializing registers 1–4 |
| Request 3 | R6–R10 | Initializing cache |

Assume now that the design is modified to include an additional four registers, triggering a test generator update to initialize those additional four registers. As modified, the generator now first requests a random number to use in selecting an instruction, then a sequence of eight random numbers to use in initializing eight registers, then a sequence of five random numbers that it uses to preload the cache. Table 2 below shows the sequence of random numbers that would be supplied to the test generator if test pattern P1 having random number seed S1 is run on the modified generator. As shown in Table 2, the first ten random numbers shown in Table 1 will be generated in the same order as shown in Table 1. However, the first time P1 was generated, the cache was initialized using R6–R10. After the modification, R6–R9 is used to initialize the new registers, and the cache is initialized using R10–R14. Consequently, the cache contents will be different when P1 is run on the modified test generator, the test results will be different, and although none of P1's control parameters were changed, the test is not repeatable.

TABLE 2

| Generator Request | Random number supplied | Random number use |
|---|---|---|
| Request 1 | R1 | Selecting instruction for generation |
| Request 2 | R2–R9 | Initializing registers 1–8 |
| Request 3 | R10–R14 | Initializing cache |

The present invention solves this problem by providing an apparatus and method that insures that the same random numbers are always provided to a computer program such as a test generator or simulation model, in response to the same call in which they were first provided, every time a test that includes a particular seed number for the random number generator is run, regardless of whether the program has been modified. Consequently, the present invention insures that tests and other executable programs that require random numbers to be generated from a specific seed and supplied to the program are repeatable across multiple versions and upgrades of the software.

SUMMARY OF THE INVENTION

The present invention comprises a random number indexing method and apparatus that eliminates the link between the specific random number provided to a computer program and the relative location in the program of its corresponding call. The present invention includes a pseudo-random number generator that generates a sequence of pseudo-random numbers in response to a seed, an index array that uniquely identifies each generated pseudo-random number with an identifying indicia in a one-to-one correspondence, and a computer program that uses the identifying indicia in the index array to call for and receive pseudo-random numbers. In some embodiments, the index array is included in the computer program. In some embodiments, upon initialization, the computer program provides the seed value to the pseudo-random number generator and then populates the index array.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is an apparatus and method that insures that the same random numbers are always provided to a computer program such as a test generator or simulation model, in response to the same call in which they were first provided, every time a test that includes a particular seed number for the random number generator is run, regardless of whether the program has been modified. This disclosure describes numerous specific details that include specific encodings and structures in order to provide a thorough understanding of the present invention. One skilled in the art will appreciate that one may practice the present invention without these specific details. In addition, the present invention is described in the context of generating and running a dynamically generated pseudo-random test pattern on a simulation of a complex sequential logic circuit such as a processor. However, those skilled in the art will recognize that the present invention can be used with any computer program, in any application, that includes multiple calls for random numbers, where the software is subject to periodic updates and the user desires or requires that the same random number be provided to specific functions in the software from software version to software version. Finally, the terms "random number" and "pseudo-random number" are used in this specification interchangeably. Those skilled in the art will recognize that a pseudo-random number is a deterministic number determined in a fashion that causes it to appear random when in fact it is not. A series of pseudo-random numbers is generated by providing a seed value to a pseudo-random number generator. Those skilled in the art recognize that a certain specific sequence of pseudo-random numbers can be repeatably generated by providing the same seed value to the same pseudo-random number generator.

Figure 1:
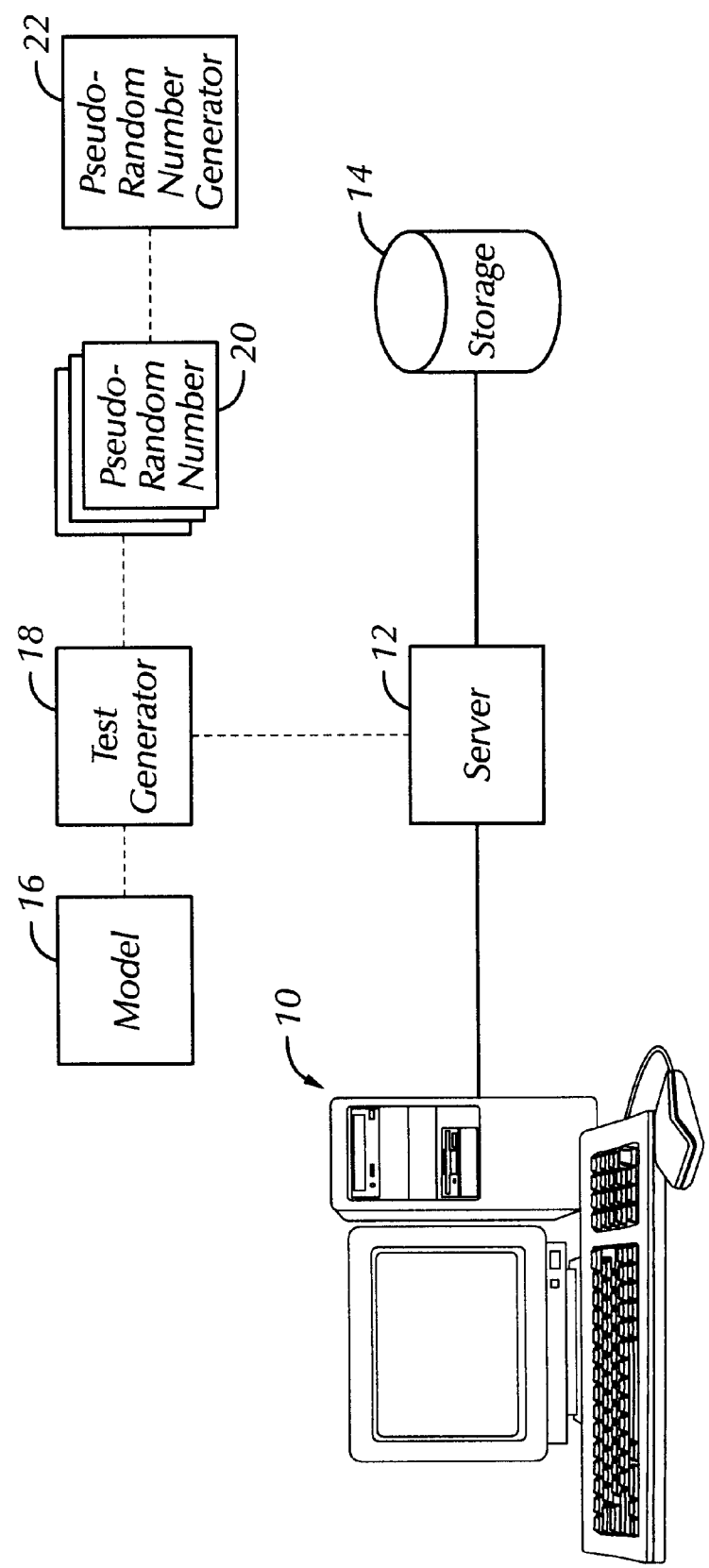
FIG. 1 shows a typical networked computer environment in which the present invention may be practiced.

FIG. 1 illustrates a typical networked computer environment in which the present invention may be practiced. A user at a workstation 10 runs a test pattern that has been generated by a test generator 18 that either includes or interfaces with a model 16 of a design under test that is capable of simulating the execution of instructions generated by the test generator 18. Workstation 10 is coupled to a server 12, which is in turn coupled to a shared storage device 14. Server 12 provides the facilities with which to run the simulation. When the test pattern is run, one or more pseudo-random numbers 20 generated by a pseudo-random number generator 22 is provided to the test generator 18 and/or model 16.

Figure 2:
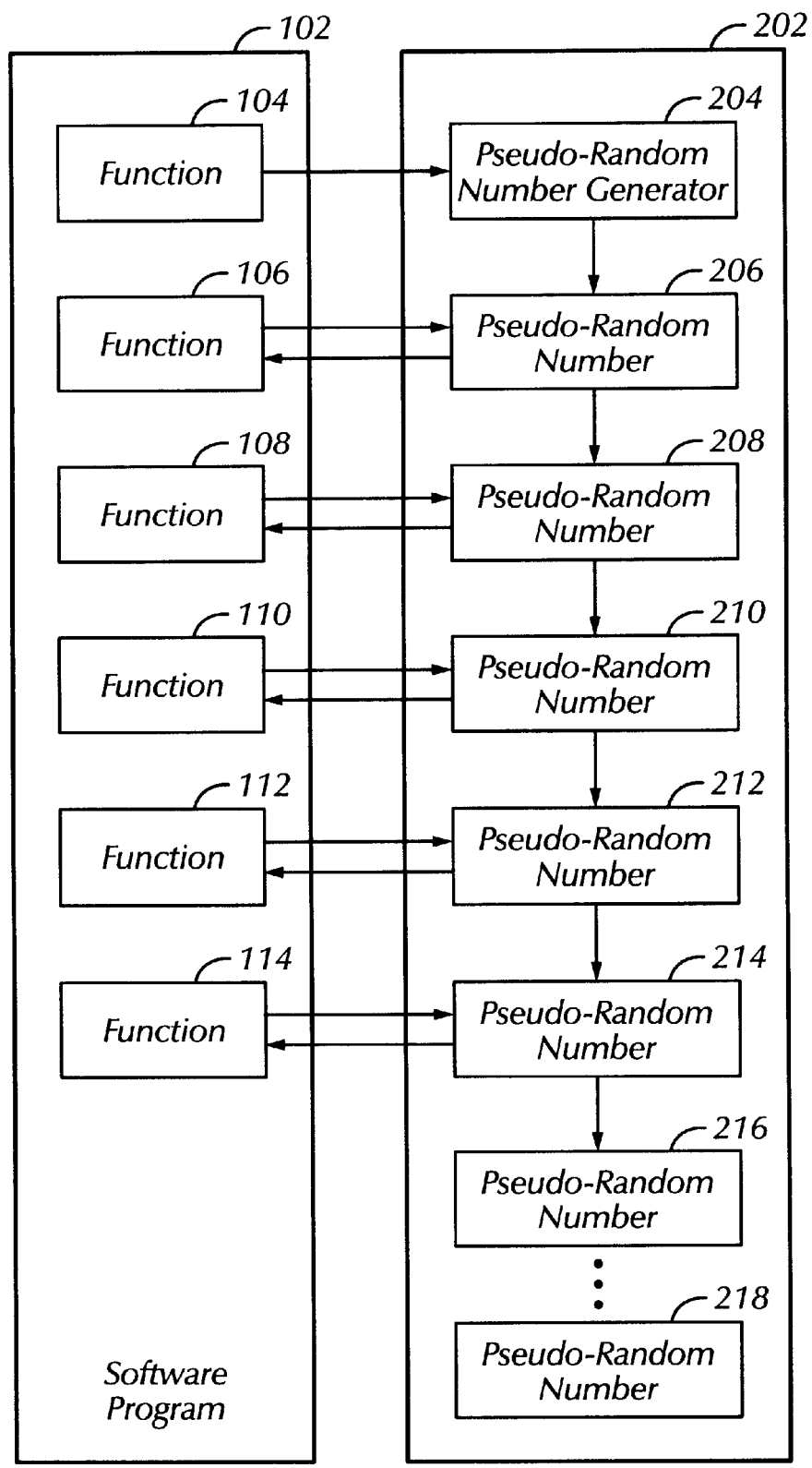
FIG. 2 shows how a typical computer program having multiple calls for a random number interfaces with a random number generator to receive random numbers.

FIG. 2 shows how a typical computer program having multiple calls for a random number interfaces with a random number generator to receive random numbers. FIG. 2 illustrates a computer program 102 that includes functions 104, 106, 108, 110, 112, and 114, and a pseudo-random number generation 202 that might comprise a linear finite state machine (LFSM) or other well-known pseudo-random number generator 204 comprising a characteristic polynomial that stochastically generates a series of non-sequential, pseudo-random numbers 206, 208, 210, 212, 216, and 218 in response to a seed. In FIG. 2, function 104 provides a seed to the number generator 204, which generates pseudo-random numbers 206–218. Software function 106 requests a random number and receives the number designated 206 in FIG. 2. Likewise, function 108 requests a number and receives 208, function 110 requests a number and receives 210, function 112 requests a number and receives 212, and function 114 requests a number and receives 214. In the example shown in FIG. 2, numbers 216 and 218 are not provided to computer program 102, because they are not needed.

Figure 3:
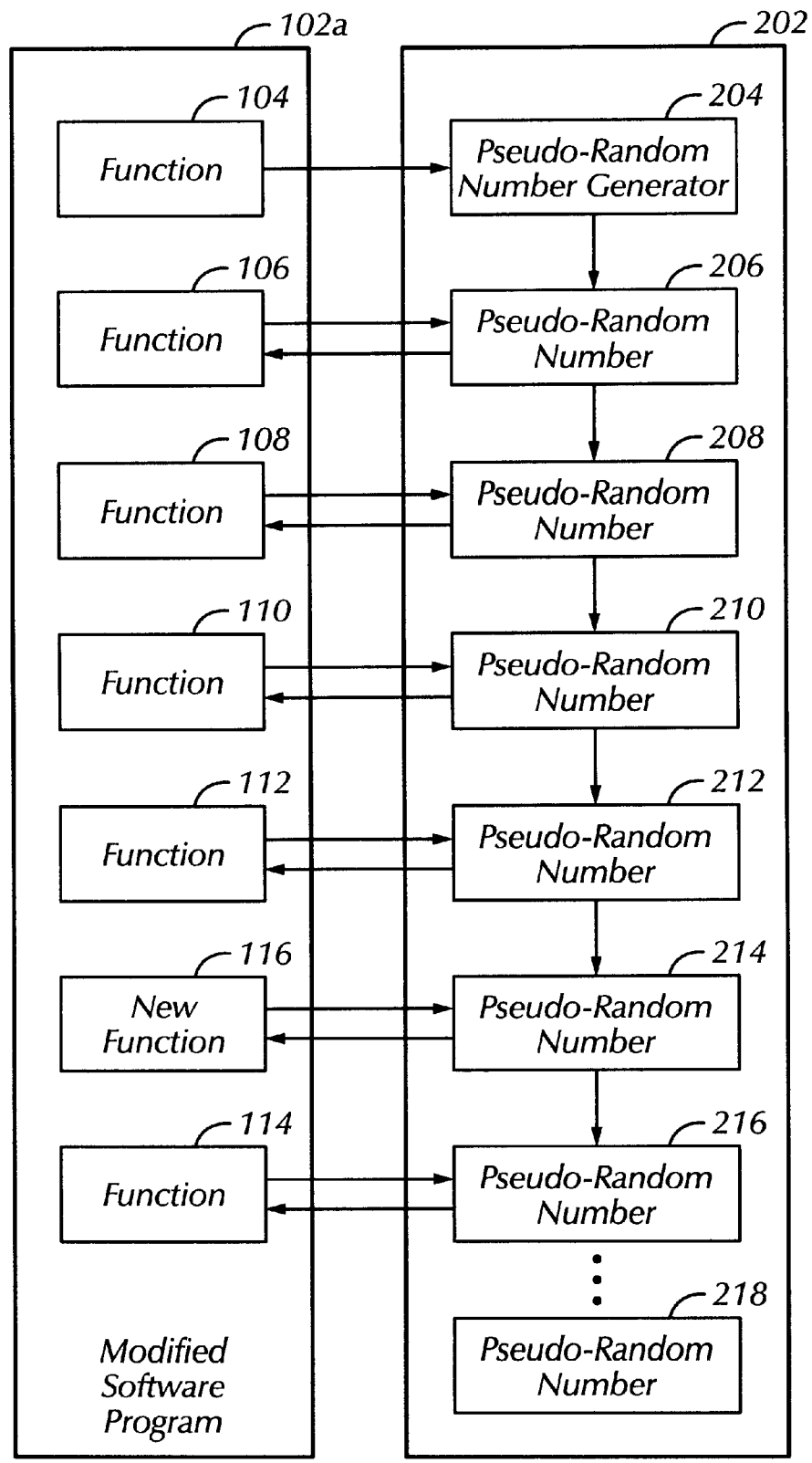
FIG. 3 shows how a modification to the FIG. 2 computer program affects the value of the random number provided to subsequent calls in the computer program, even when they have not been modified.

FIG. 3 shows the same computer program, now designated 102a, after it has been modified by adding a new function, 116. In this example, function 116 has been inserted between function 112 and function 114 to indicate that in program 102a, new function 116 executes before old function 114. In FIG. 3, the pseudo-random number generator 202 has not changed, so the same sequence of numbers 206–218 is generated in response to the seed provided by function 104. In FIG. 3, the same numbers 206–212 are provided to functions 106–112, because when computer program 102a compiles, functions 206–212 execute in the same order in program 102a that they executed in program 102.

However, as FIG. 3 shows, when function 116 executes, it requests a number from the pseudo-random number generator 202, and in response to that request, receives the number designated 214, because that is the next number in the series generated by the number generator 204. When function 114 executes and requests the number it needs, it will receive the number designated 216, because that is the next number in the series. Previously, function 114 had received the number designated 214. Now that it receives a different number, it may achieve a different outcome, which might result in a different processor state. If computer program 102a is a program in which the processor state is important or the outcome must be repeatable (such as a test pattern in a design verification effort), then the above scenario could be problematic.

Figure 4:
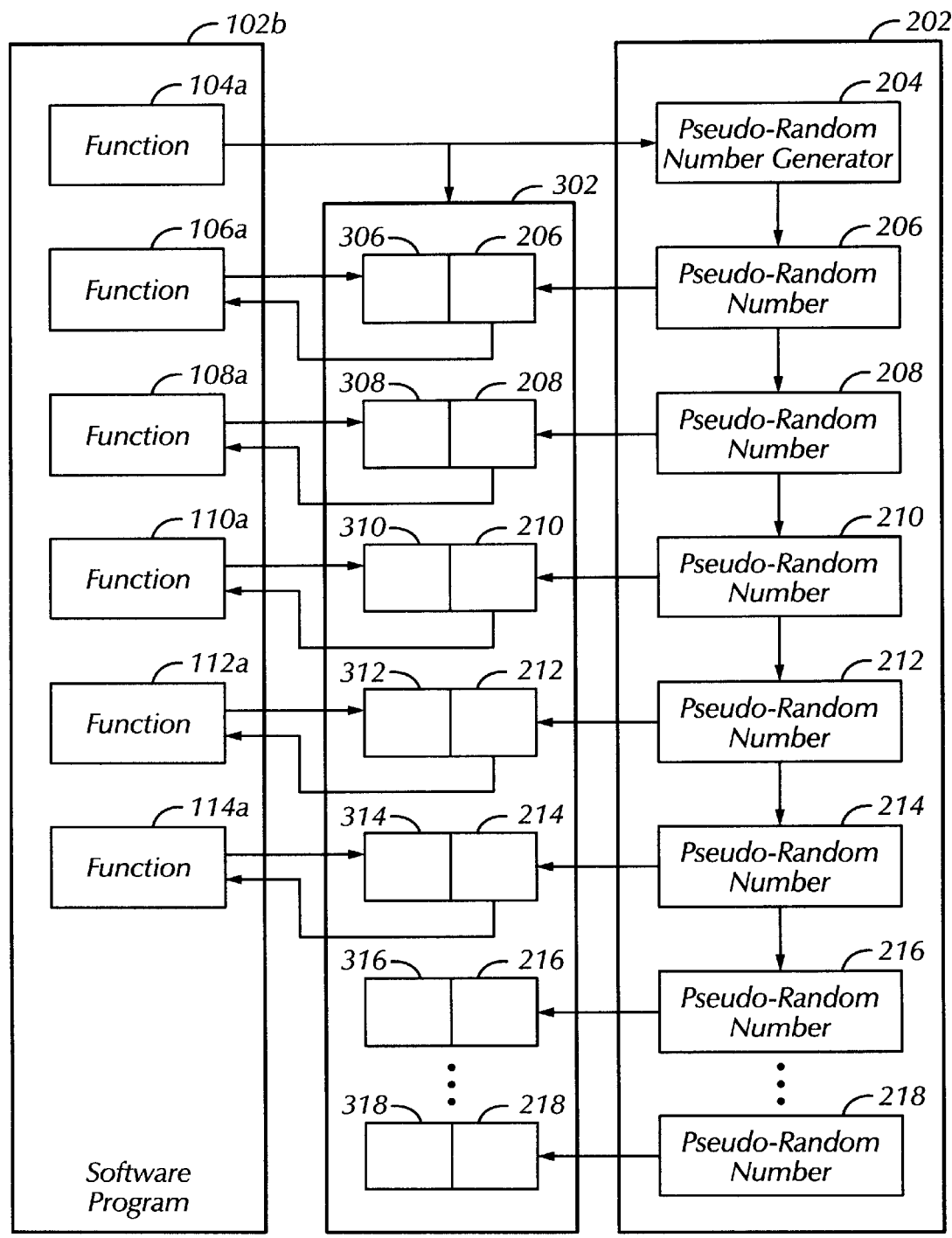
FIG. 4 shows the use of the present invention with a computer program that includes multiple calls for random numbers.

FIG. 4 shows computer program 102b, pseudo-random number generator 202, and the index array of the present invention 302. In FIG. 4, the overall function and purpose of computer program 102b is the same as computer program 102 shown in FIG. 2, but each function 104a, 106a, 108a, 110a, 112a, and 114a has been modified. Functions 106a–114a now interface with index array 302 instead interfacing directly with the random number generator 202. In one embodiment, upon initialization of the computer program 102b, software function 104a provides the seed to number generator 204, as described previously, and populates the index array 302 with the series of pseudo-random numbers 206–218 when they are generated. Index array 302 is populated by associating each number generated with an index number 306–318 in a one-to-one correspondence. In other words, random number 206 is associated with index number 306, random number 208 is associated with index number 308, and so forth. When each function 106a–114a in computer program 102 requests a random number, it does so by calling the specific index number that is associated with a random number, rather than simply requesting "the next" random number in the sequence generated by the pseudo-random number generator 202. In other words, function 106a specifically calls for the random number associated with index 306, function 108 specifically calls for the random number associated with index 308, and so forth. The index array 302 then provides the random number associated with each called index number. Those skilled in the art will understand that while FIG. 4 shows the index array 302 as functionally separate from either computer program 102b or random number generator 202, the index array and its functionality could be encompassed within either computer program 102b or random number generator 202 without departing from the present invention.

Figure 5:
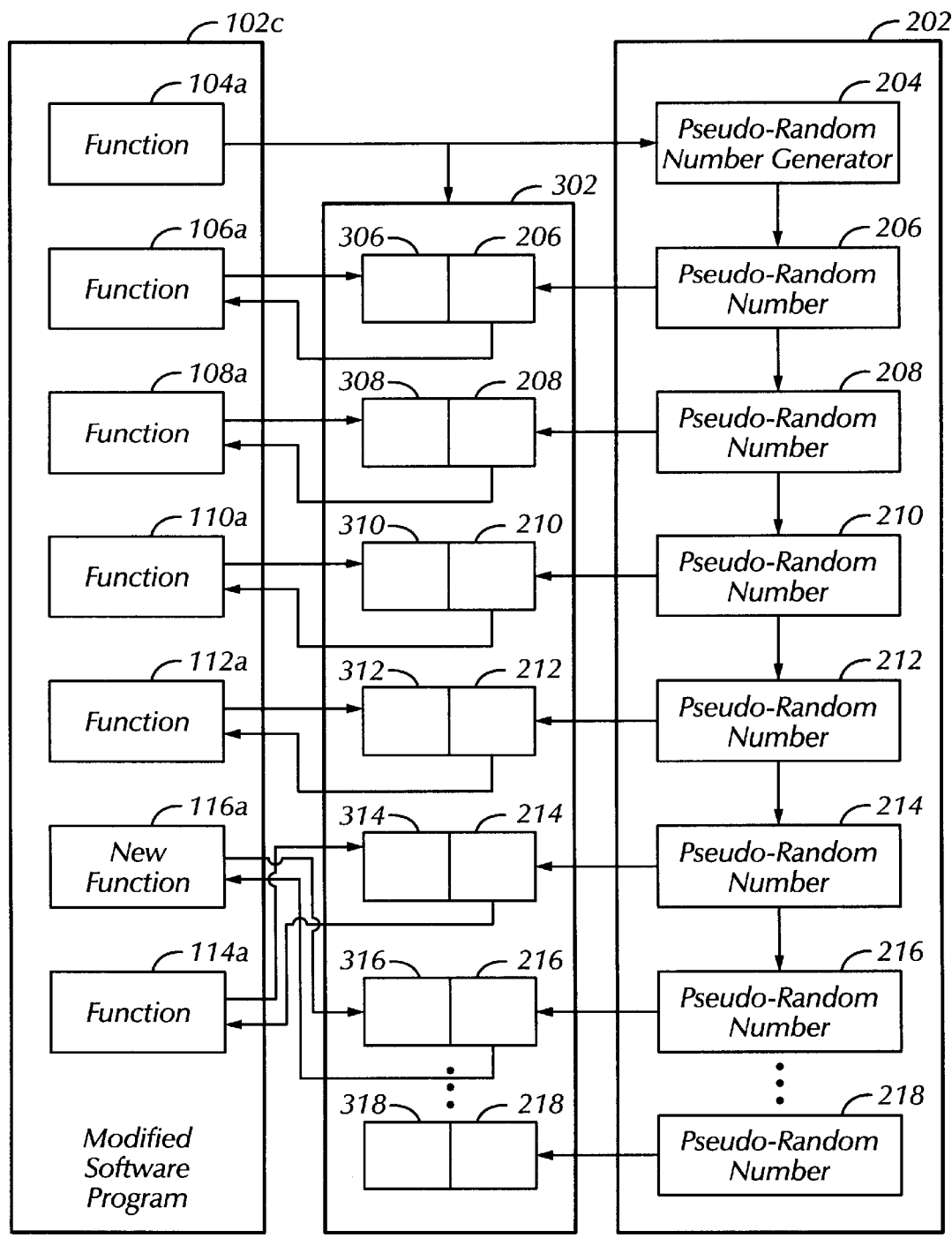
FIG. 5 shows how the present invention allows the FIG. 4 computer program to be modified without affecting the value of the random number provided to subsequent calls in the computer program.

FIG. 5 shows computer program 102c with the pseudo-random number generator 202 and the index array of the present invention 302. Computer program 102c is identical to computer program 102b, except that it has been modified by adding a new function, 116a. Like functions 106a–114a described above in connection with FIG. 4, software function 116a requests a random number by calling for the random number associated with index number 316. As described above, software function 104a provides the seed to number generator 204, and populates the index array 302 using the series of pseudo-random numbers 206–218 generated by associating each number generated with an index number 306–318 in a one-to-one correspondence. In computer program 102c, each function 106a–114a requests a random number by calling for the number associated with a specific index number within the index array 302. That request is routed to the index array 302, and the random number associated with the requested index number is provided. Those skilled in the art will recognize that using the index-oriented approach described above, rather than having functions interface directly with the random number generator, allows for the same random number to be provided to each function in a computer program each time the test pattern is executed, even after functions have been added that execute earlier in the program than existing, unchanged functions. The present invention thus assures that the test pattern is repeatable from software modification to software modification, because the user is certain that newly-added functions that call for and receive random numbers do not affect the random numbers provided to all previously existing functions—even those previously existing functions that now execute after the newly-added function.

In sum, the present invention comprises a random number indexing method and apparatus that includes a pseudo-random number generator that generates a sequence of pseudo-random numbers in response to a seed, an index array that uniquely identifies each generated pseudo-random number with an identifying indicia in a one-to-one correspondence, and a computer program that uses the identifying indicia in the index array to call for and receive pseudo-random numbers. In some embodiments, the index array is included in the computer program. In some embodiments, upon initialization, the computer program provides the seed value to the pseudo-random number generator and then populates the index array.

While the present invention is described herein in the context of dynamically generated random test patterns used in logic verification efforts, those skilled in the art will appreciate that the present invention can be used in any other application, (e.g., software encryption, electronic gaming, network security, etc.) wherein random numbers are supplied to a computer program that is subject to periodic modification, and repeatability is desired from modification to modification. Other embodiments of the invention will be apparent to those skilled in the art after considering this specification or practicing the disclosed invention. The specification and examples above are exemplary only, with the true scope of the invention being indicated by the following claims.

I claim :

1. A random number indexer, comprising:

a pseudo-random number generator that generates a sequence of pseudo-random numbers in response to a seed;

an index array that uniquely identifies each said pseudo-random number with an identifying indicia in a one-to-one correspondence; and a computer program coupled to said index array, said computer program provides said seed to said pseudo-random number generator, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

2. A random number indexing system, comprising:

a pseudo-random number generator that generates a sequence of pseudo-random numbers in response to a seed;

an index array that uniquely identifies each said pseudo-random number with an functions executes in a first order, when said plurality of functions executes in any order different from said first order, or when a new function that requests and receives a pseudo-random number is added to said computer program and said new function executes either before said first function or after said first function but before said last function.

3. A method that makes a random number indexer, comprising:

providing a pseudo-random number generator that generates a sequence of pseudo-random numbers in response to a seed;

coupling an index array to said pseudo-random number generator that uniquely identifies each said pseudo-random number with an identifying indicia in a one-to-one correspondence; and providing a computer program coupled to said index array, said computer program provides said seed to said pseudo-random number generator, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of correspondence; and requesting and receiving a series of pseudo-random numbers in response to the execution of a computer program coupled to said index array, said computer program provides said seed to said pseudo-random number generator, said computer program further comprises a plurality of functions including a first function and a last function wherein each said function includes a request for a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

4. A method that indexes random numbers, comprising:

generating a sequence of pseudo-random numbers using a pseudo-random number generator responding to a seed;

uniquely identifying each said pseudo-random number using an index array that associates each said pseudo-random number with an identifying indicia in a one-to-one correspondence; and requesting and receiving a series of pseudo-random numbers in response to the execution of a computer program coupled to said index array, said computer program provides said seed to said pseudo-random number generator, said computer program further comprises a plurality of functions including a first function and a last function wherein each said function includes a request for a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

5. A program storage device readable by a machine, tangibly embodying a program of instructions executable by the machine to perform a method that indexes random numbers, comprising:

generating a sequence of pseudo-random numbers using a pseudo-random number generator responding to a seed;

uniquely identifying each said pseudo-random number using an index array that associates each said pseudo-random number with an identifying indicia in a one-to-one identifying indicia in a one-to-one correspondence; and a computer program coupled to said index array, said computer program provides said seed to said pseudo-random number generator, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

6. A dependent claim according to claims 1, 2, 3, 4, or 5 wherein said index array is contained within said computer program.

7. A dependent claim according to claims 1, 2, 3, 4, or 5 wherein said computer program populates said index array during initialization.

8. A random number indexer, comprising:

a pseudo-random number generator that generates a sequence of pseudo-random numbers in response to a seed; and a computer program that further comprises an index array that uniquely identifies each said pseudo-random number with an identifying indicia in a one-to-one correspondence, said computer program provides said seed to said pseudo-random number generator and populates said index array during initialization, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

9. A random number indexing system, comprising:

a pseudo-random number generator that generates a sequence of pseudo-random numbers in response to a seed; and a computer program that further comprises an index array that uniquely identifies each said pseudo-random number with an identifying indicia in a one-to-one correspondence, said computer program provides said seed to said pseudo-random number generator and populates said index array during initialization, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

10. A method that makes a random number indexer, comprising:

providing a pseudo-random number generator that generates a sequence of pseudo-random numbers in response to a seed; and providing a computer program that further comprises an index array that uniquely identifies each said pseudo-random number with an identifying indicia in a one-to-one correspondence, said computer program provides said seed to said pseudo-random number generator and populates said index array during initialization, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

11. A method that indexes random numbers, comprising:

generating a sequence of pseudo-random numbers using a pseudo-random number generator responding to a seed; and uniquely identifying each said pseudo-random number with an identifying indicia in a one-to-one correspondence using an index array within a computer program, wherein said computer program provides said seed to said pseudo-random number generator and populates said index array during initialization, said computer program further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

12. A program storage device readable by a machine, tangibly embodying a program of instructions executable by the machine to perform a method that indexes random numbers, comprising:

generating a sequence of pseudo-random numbers using a pseudo-random number generator responding to a seed; and uniquely identifying each said pseudo-random number with an identifying indicia in a one-to-one correspondence using an index array within a computer program, wherein said computer program provides said seed to said pseudo-random number generator and populates said index array during initialization, said computer further comprises a plurality of functions including a first function and a last function, each said function further requests and receives a pseudo-random number;

wherein each said request for a pseudo-random number further comprises a request for a pseudo-random number uniquely corresponding to a specifically identified one of said identifying indicia of said index array, such that each said function within said plurality of functions receives the same one specific pseudo-random number if said seed remains constant under all of the following circumstances: when said plurality of functions executes in a first order, when said plurality of functions executes in any order different from said first order, or when a new function that requests and receives a pseudo-random number is added to said computer program and said new function executes either before said first function or after said first function but before said last function.

* * * * *